United States Patent
Li et al.

(10) Patent No.: US 11,042,251 B2
(45) Date of Patent: Jun. 22, 2021

(54) IN-CELL TOUCH PANEL AND DISPLAY DEVICE

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Yanchen Li, Beijing (CN); Rui Xu, Beijing (CN); Shengji Yang, Beijing (CN); Weijie Zhao, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 339 days.

(21) Appl. No.: 14/902,203

(22) PCT Filed: Aug. 13, 2015

(86) PCT No.: PCT/CN2015/086812
§ 371 (c)(1),
(2) Date: Dec. 30, 2015

(87) PCT Pub. No.: WO2016/112683
PCT Pub. Date: Jul. 21, 2016

(65) Prior Publication Data
US 2016/0370917 A1    Dec. 22, 2016

(30) Foreign Application Priority Data

Jan. 15, 2015  (CN) .......................... 201510020674.2

(51) Int. Cl.
*G06F 3/044* (2006.01)
*G06F 3/041* (2006.01)
*G02F 1/1333* (2006.01)

(52) U.S. Cl.
CPC ........ *G06F 3/0443* (2019.05); *G02F 1/13338* (2013.01); *G06F 3/0412* (2013.01);
(Continued)

(58) Field of Classification Search
CPC ........... G06F 2203/04111; G06F 3/044; G06F 3/0448; G06F 3/04164; G06F 3/0443;
(Continued)

(56) References Cited

U.S. PATENT DOCUMENTS 9,348,460 B2 *  5/2016  Lee ................. G06F 3/0412
2010/0194697 A1 * 8/2010  Hotelling .......... G06F 3/0446
                                                      345/173

(Continued)

FOREIGN PATENT DOCUMENTS

CN      104020893 A    9/2014
CN      104102402 A    10/2014
(Continued)

OTHER PUBLICATIONS

First Chinese Office Action dated Dec. 30, 2016; Appln. No. 201510020674.2.
(Continued)

*Primary Examiner* — Patrick N Edouard
*Assistant Examiner* — Douglas M Wilson (57) ABSTRACT

An in-cell touch panel and a display device are provided. The in-cell touch panel includes wires (03) and self-capacitive electrodes (02), and further includes a plurality of connecting line groups (04) not disposed in the same layer as the self-capacitive electrodes (02). Each of the connecting line groups (04) includes a plurality of sub connecting lines
(Continued)

(041) disposed separately, sub connecting lines (041) belonging to a same connecting line group correspond to different ones of the self-capacitive electrodes (02), respectively, and each sub connecting line (041) is connected to a respective self-capacitive electrode through at least one via hole (V) penetrating an insulating layer (05). No via hole is provided in the region where the wires and the self-capacitive electrodes overlap, and each wire (03) is connected to a respective self-capacitive electrode (02) through at least one sub connecting line (041) that is connected to the respective self-capacitive electrode. With the in-cell touch panel, the problem of non-uniform display picture caused by non-uniform distribution of via holes in an insulating layer in the conventional technology can be solved.

18 Claims, 11 Drawing Sheets

(52) U.S. Cl.
CPC ...... *G06F 3/04164* (2019.05); *G06F 3/04166* (2019.05); *G06F 3/0448* (2019.05); *G06F 2203/04103* (2013.01); *G06F 2203/04111* (2013.01)

(58) Field of Classification Search
CPC ............... G06F 3/04166; G06F 3/0412; G06F 2203/04103; G06F 3/04184; G09G 2300/0413; G02F 1/13338
See application file for complete search history.

(56) References Cited

U.S. PATENT DOCUMENTS

| | | | |
|---|---|---|---|
| 2012/0218199 A1* | 8/2012 | Kim | G02F 1/136286 345/173 |
| 2014/0062916 A1 | 3/2014 | Hong et al. | |
| 2014/0118277 A1* | 5/2014 | Kim | G06F 3/0443 345/173 |
| 2015/0085208 A1* | 3/2015 | Lee | G06F 3/0445 349/12 |
| 2015/0261348 A1* | 9/2015 | Jang | G06F 3/04166 345/174 |
| 2015/0378390 A1 | 12/2015 | Liu et al. | |
| 2016/0026291 A1 | 1/2016 | Zhao et al. | |
| 2016/0041665 A1* | 2/2016 | Gwon | G06F 3/0443 345/174 |
| 2016/0048267 A1* | 2/2016 | Lee | G06F 3/045 345/173 |
| 2017/0090644 A1* | 3/2017 | Yao | G06F 3/04164 |

FOREIGN PATENT DOCUMENTS

| | | |
|---|---|---|
| CN | 104142772 A | 11/2014 |
| CN | 104267862 A | 1/2015 |
| CN | 104503650 A | 4/2015 |

OTHER PUBLICATIONS

International Search Report and Written Opinion dated Oct. 29, 2015; PCT/CN2015/086812.

* cited by examiner

IN-CELL TOUCH PANEL AND DISPLAY DEVICE

TECHNICAL FIELD

Embodiments of the present invention relate to an in-cell touch panel and a display device.

BACKGROUND

With the rapid development of the display technology, touch panels have gradually spread all over people's lives. Generally, touch panels can be classified into an add-on mode touch panel, an on-cell touch panel, and an in-cell touch panel according to the composition and structure. For the add-on touch panel, a touch panel and a liquid crystal display (LCD) are produced separately, and then they are attached together to form a liquid crystal display panel having a touch function. The add-on touch panel suffers in the drawbacks of a higher production cost, a lower light transmittance, a thicker module and so on. While for an in-cell touch panel, touch electrodes of the touch panel are embedded inside a liquid crystal display panel, so that overall thickness of the module can be thinned, and the production cost of the touch panel can be reduced greatly as well, and thus it gets the favor of the major panel manufacturers.

In general, with respect to an in-cell touch panel, detection of touch location of a finger is achieved by using the principle of mutual capacitance or self-capacitance. A plurality of self-capacitive electrodes disposed in the same layer and insulated from each other may be arranged in the touch panel by using the principle of self capacitance. When a human body does not touch the panel, the capacitance born on each self-capacitive electrode is a fixed value. When a human body contacts the panel, the capacitive born on a corresponding self-capacitive electrode is the fixed value plus the body capacitance. With the touch detection chip, the touch location can be judged by detecting the change of capacitance value of each self-capacitive electrode in a touch period. In view of the fact that the body capacitance can act on all self capacitances, as compared with the mode in which the body capacitance can merely act on the projective capacitance in mutual capacitances, the amount of touch change caused by touch of a human body with the panel will be larger than that of a touch panel produced by using the principle of mutual capacitance. So, relative to a touch panel with mutual capacitance, the signal to noise ratio of touch can be effectively raised by a touch panel with self capacitance. Thus, the accuracy of touch sensing is enhanced.

Figure 1:
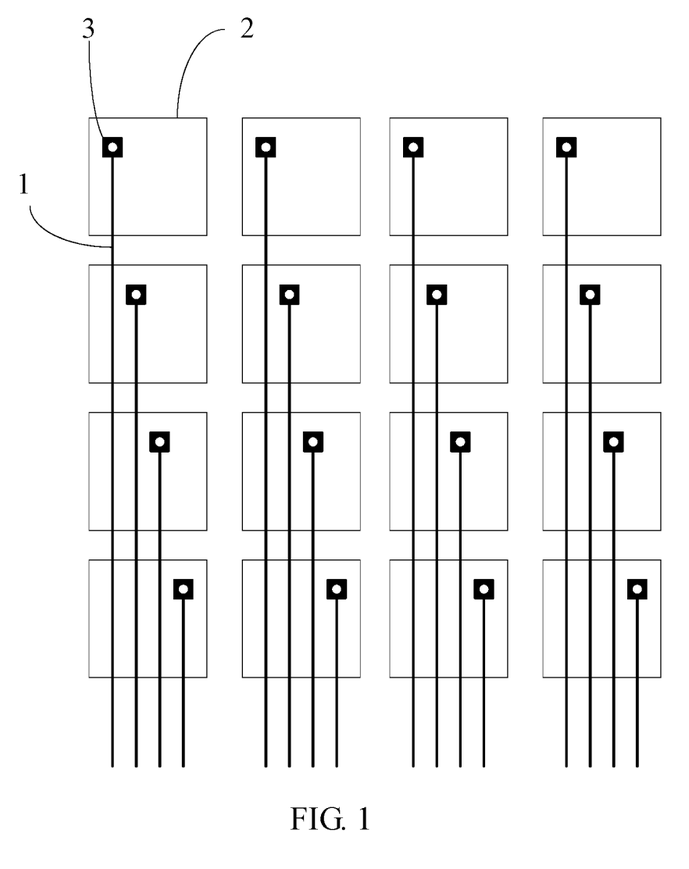
FIG. 1 is a structural schematic view illustrating an in-cell touch panel.

In the above in-cell touch panel, for the sake of connecting self-capacitive electrodes to a touch detection chip, wires connected to self-capacitive electrodes in correspondence will usually be provided. For example, as illustrated in FIG. 1, wires 1 are located below self-capacitive electrodes 2, and each wire 1 is only connected to a self-capacitive electrode 2 corresponding to it through a via hole 3, and is not conductive to other self-capacitive electrode 2. However, in this structure, distribution of via holes 3 in the whole display panel is non-uniform, and thus uniformity of a display picture will be affected.

SUMMARY

According to at least one embodiment of the present invention, there is provided an in-cell touch panel, for solving the problem that the display picture is non-uniform in the conventional technology.

According to at least one embodiment of the invention, there is provided an in-cell touch panel, comprising an upper substrate and a lower substrate disposed oppositely, a plurality of self-capacitive electrodes independent of each other and arranged in a matrix form, a plurality of wires that are not disposed in the same layer as the plurality of self-capacitive electrodes and connect the plurality of self-capacitive electrodes to a touch detection chip, a plurality of connecting line groups not disposed in the same layer as the plurality of self-capacitive electrodes, and an insulating layer located between the connecting line groups and the self-capacitive electrodes; wherein, the plurality of self-capacitive electrodes, the plurality of wires and the plurality of connecting line groups are each located on a side of the upper substrate facing the lower substrate or a side of the lower substrate facing the upper substrate;

each of the connecting line groups includes a plurality of sub connecting lines disposed separately, sub connecting lines belonging to a same connecting line group correspond to different ones of the self-capacitive electrodes, respectively, and each sub connecting line is connected to a respective self-capacitive electrode through at least one via hole penetrating the insulating layer; and each of the wires is connected to a respective self-capacitive electrode through at least one sub connecting line that is connected to the respective self-capacitive electrode.

For example, in an in-cell touch panel provided by an embodiment of the invention, the sub connecting lines belonging to a same connecting line group are situated in a same straight line, and the connecting line groups are arranged in parallel.

For example, in an in-cell touch panel provided by an embodiment of the invention, all of the sub connecting lines are disposed in a same layer.

For example, in an in-cell touch panel provided by an embodiment of the invention, an extending direction of the wires is the same as an extending direction of the connecting line groups.

For example, in an in-cell touch panel provided by an embodiment of the invention, the plurality of connecting line groups and the plurality of wires are disposed in a same layer.

For example, in an in-cell touch panel provided by an embodiment of the invention, the wires and the connecting line groups are disposed alternately.

For example, in an in-cell touch panel provided by an embodiment of the invention, the wires are of a same length.

For example, in an in-cell touch panel provided by an embodiment of the invention, each sub connecting line is respectively connected to a respective self-capacitive electrode through a same number of via holes.

For example, in an in-cell touch panel provided by an embodiment of the invention, an extending direction of the connecting line groups is a column direction or a row direction.

For example, in an in-cell touch panel provided by an embodiment of the invention, the touch detection chip is configured to judge a touch location by detecting change in capacitance value of each of the self-capacitive electrodes in a touch period.

For example, in an in-cell touch panel provided by an embodiment of the invention, the self-capacitive electrodes are multiplexed as a common electrode layer;

the touch detection chip is also configured to load a common electrode signal onto each of the self-capacitive electrodes in a display period.

For example, in an in-cell touch panel provided by an embodiment of the invention, the common electrode layer is located on a side of the lower substrate facing the upper substrate.

For example, an in-cell touch panel provided by an embodiment of the invention further includes a plurality of data lines located on a side of the lower substrate facing the upper substrate; wherein, the wires and the plurality of data lines are disposed in a same layer; and/or the connecting line groups and the plurality of data lines are disposed in a same layer.

For example, an in-cell touch panel provided by an embodiment of the invention further includes a plurality of pixel units located on a side of the lower substrate facing the upper substrate and arranged in a matrix form;

each of the self-capacitive electrodes corresponds to multiple pixel units, the plurality of wires and the plurality of connecting line groups each extend along a column direction, and the connecting line groups and the wires disposed alternately correspond to respective ones of columns of pixel units, respectively.

For example, in an in-cell touch panel provided by an embodiment of the invention, each of the self-capacitive electrodes is connected to the touch chip through one or more of the wires, and each of the wires is respectively connected to a respective self-capacitive electrode through one or more of the sub connecting lines.

According to at least one embodiment of the invention, there is further provided a display device, which includes the in-cell touch panel as stated in any of embodiments of the invention.

BRIEF DESCRIPTION OF THE DRAWINGS

In order to illustrate the technical solution of the embodiments of the invention more clearly, the drawings of the embodiments will be briefly introduced below; it is obvious that the drawings as described below are only related to some embodiments of the invention, but are not limitative of the invention.

DETAILED DESCRIPTION

In order to make objects, technical details and advantages of the embodiments of the invention apparent, hereinafter, the technical solutions of the embodiments of the invention will be described in a clearly and fully understandable way in connection with the drawings related to the embodiments of the invention. It is obvious that the described embodiments are just a part but not all of the embodiments of the invention. Based on the described embodiments of the invention, those ordinarily skilled in the art can obtain other embodiment(s), without any inventive work, which should be within the scope sought for protection by the invention.

Hereinafter, in conjunction with drawings, specific embodiments of an in-cell touch panel and a display device provided by embodiments of the invention will be described in detail.

The thickness and shape of film layers in drawings do not reflect the true scale, and the purpose is merely to schematically illustrate contents of the present invention.

Figure 2A:
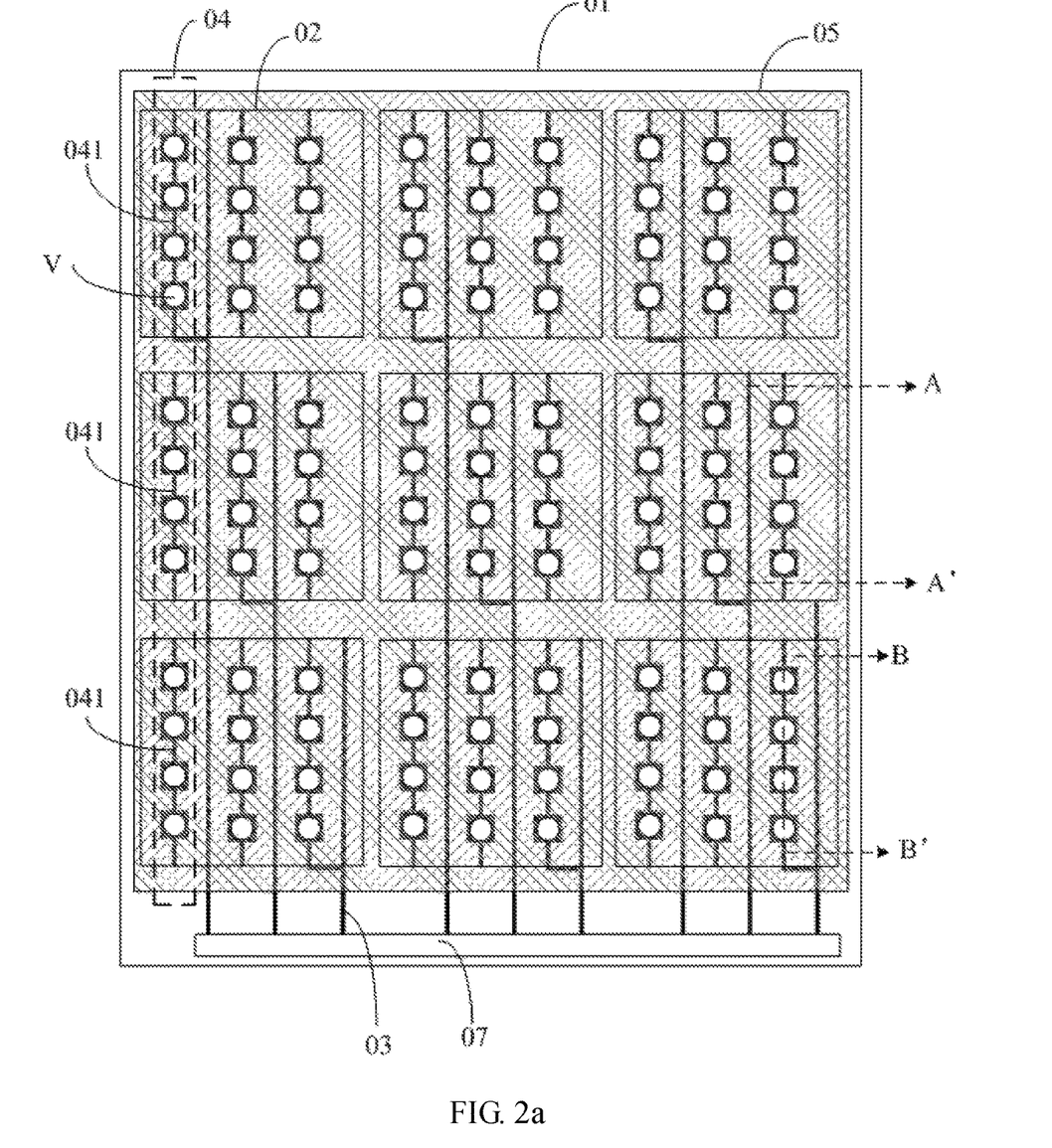
FIG. 2a is a structural schematic view illustrating an in-cell touch panel provided by an embodiment of the invention.
Figure 2B:
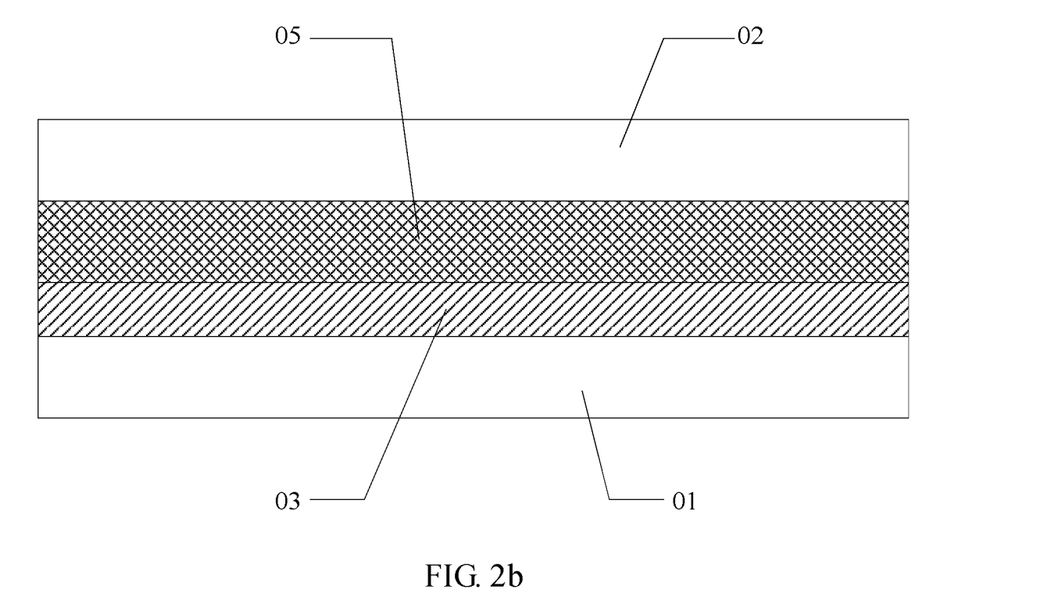
FIG. 2b is a structural schematic view illustrating the section of the in-cell touch panel illustrated in FIG. 2a taken along the direction of A-A'.
Figure 2C:
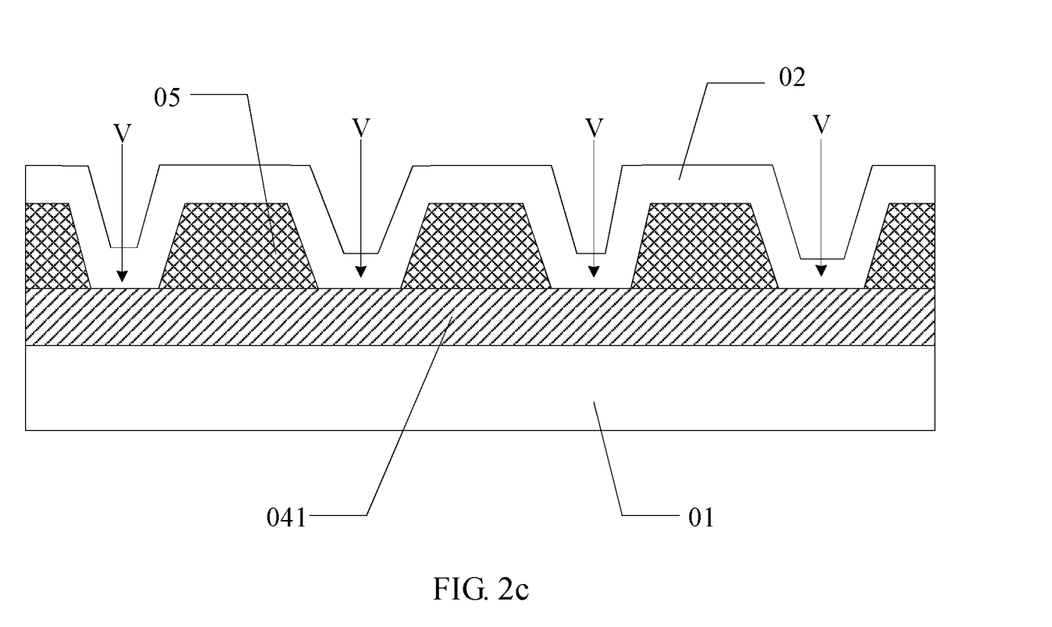
FIG. 2c is a structural schematic view illustrating the section of the in-cell touch panel illustrated in FIG. 2a taken along the direction of B-B'.

According to an embodiment of the invention, there is provided an in-cell touch panel, as illustrated in FIG. 2a to FIG. 2c, which includes an upper substrate 011 (not illustrated in the figure, please refer to FIG. 2d and FIG. 2e) and a lower substrate 01 disposed opposite to each other, a plurality of self-capacitive electrodes 02 independently of each other and arranged in a matrix form, and a plurality of wires 03 that are not disposed in the same layer as the self-capacitive electrodes 02 and connect the self-capacitive electrodes 02 to a touch detection chip 07. The touch detection chip 07 can judge the touch location by detecting the change in capacitance value of each self-capacitive electrode 02 in a touch period. The touch panel further includes, a plurality of connecting line groups 04 not disposed in the same layer as the self-capacitive electrodes 02, and an insulating layer 05 located between the connecting line groups 04 and the self-capacitive electrodes 02; wherein, the self-capacitive electrodes 02, the wires 03 and the connecting line groups 04 are each located on a side of the upper substrate facing the lower substrate 01 or a side of the lower substrate 01 facing the upper substrate. The configuration in which the self-capacitance electrodes 02, the wires 03 and the connecting line groups 04 are disposed on a side of the lower substrate 01 facing the upper substrate is illustrated in FIG. 2a to FIG. 2c.

Each connecting line group 04 includes a plurality of sub connecting lines 041 disposed separately, sub connecting lines 041 belonging to the same connecting line group 04 correspond to different ones of the self-capacitive electrodes 02, respectively, and each sub connecting line 041 is connected to a respective self-capacitive electrode 02 through at least one via hole penetrating the insulating layer 05.

A wire 03 is connected to a respective self-capacitive electrode 02 through at least one sub connecting line 041 connected with the respective self-capacitive electrode 02.

With respect to the above in-cell touch panel provided by embodiments of the invention, it includes wires and self-capacitive electrodes that are disposed in different layers, and includes a plurality of connecting line groups not disposed in the same layer as the self-capacitive electrodes besides; each of the connecting line groups includes a plurality of sub connecting lines disposed separately, sub connecting lines belonging to the same connecting line group correspond to different ones of the self-capacitive electrodes, respectively, and each sub connecting line is connected to a respective self-capacitive electrode through at least one via hole penetrating an insulating layer; no via hole is provided in the region where wires and self-capacitive electrodes overlap, and a wire is connected to a respective self-capacitive electrode through at least one sub connecting line that is connected to the respective self-capacitive electrode. In the above in-cell touch panel, each connecting line group is configured to a plurality of sub connecting lines disposed separately, so as to ensure mutual insulation between self-capacitive electrodes. By evenly arranging via holes in a region in correspondence with each sub connecting line of a connecting line group, it is ensured that via holes are uniformly distributed in the in-cell touch panel. A wire is connected to a respective self-capacitive electrode through at least one sub connecting line that is connected to the respective self-capacitive electrode, connection of a self-capacitive electrode and a respective wire is ensured. Therefore, with the in-cell touch panel, on the grounds that the proper connection between a self-capacitive electrode and a wire can be ensured, the problem of non-uniform display picture caused by non-uniform distribution of via holes in an insulating layer in the general technology is solved.

It is to be noted that, in the above in-cell touch panel provided by embodiments of the invention, the insulating layer between self-capacitive electrodes and connecting line groups may be constituted by multiple film layers, and may also be constituted by one film layer, and no limit will be set here.

For example, in an in-cell touch panel provided by an embodiment of the invention, as illustrated in FIG. 2a, sub connecting lines 041 belong to the same connecting line group 04 are situated in the same straight line, and connecting line groups 04 are arranged in parallel.

Figure 2D:
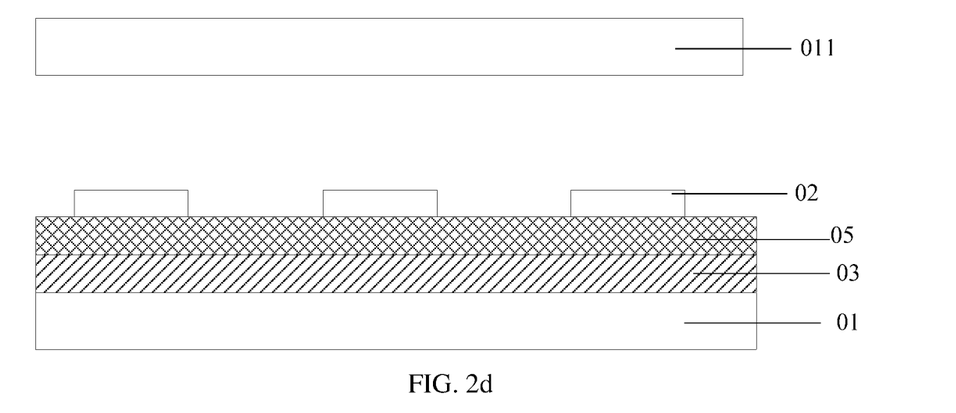
FIG. 2d is a structural schematic view illustrating an in-cell touch panel provided by an embodiment of the invention (sectional view taken along the direction of a wire)
Figure 2E:
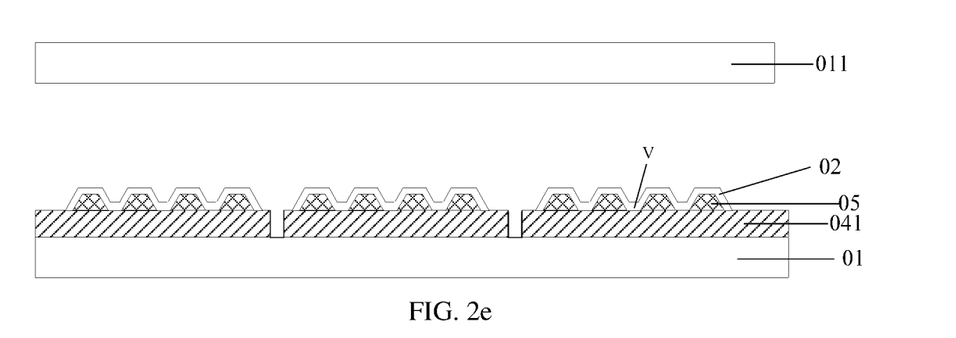
FIG. 2e is a structural schematic view illustrating an in-cell touch panel provided by an embodiment of the invention (sectional view taken along the direction of a sub connecting wire)

For example, as illustrated in FIG. 2d and FIG. 2e, a sectional view taken along the direction of wires and a sectional view taken along the direction of sub connecting lines of an in-cell touch panel provided by an embodiment of the invention are illustrated, respectively. The in-cell touch panel includes an upper substrate 011 and a lower substrate 01 disposed oppositely, and illustration has been given in the figure with reference to an example in which a plurality of self-capacitive electrodes 02, a plurality of wires 03 and a plurality of connecting line groups 04 are each located on a side of the upper substrate facing the lower substrate. A plurality of self-capacitive electrodes 02, a plurality of wires 03 and a plurality of connecting line groups 04 may also be located on a side of the lower substrate facing the upper substrate. FIG. 2a and FIG. 2e are merely exemplary illustration.

It is to be noted that, "a plurality of" in the stated "a plurality of connecting line groups" of various embodiments of the invention, for example, means multiple groups.

For example, in order to simplify the manufacturing process, in the in-cell touch panel provided by embodiments of the invention, all of sub connecting lines are disposed in the same layer. As such, the pattern of all connecting line groups can be formed only by one patterning process, so that the process steps can be simplified, and the manufacturing cost is saved. Certainly, the sub connecting lines may be fabricated in layers, and no limit will be set here.

For example, in an in-cell touch panel provided by an embodiment of the invention, as illustrated in FIG. 4a to FIG. 4d, the extending direction of each wire 03 is the same as the extending direction of connecting line groups 04.

For example, in an in-cell touch panel provided by an embodiment of the invention, the connecting line groups and the wires are disposed in the same layer. As such, the patterns of the connecting line groups and the wires can be formed only by one patterning process, so that the process steps can be simplified, and the manufacturing cost is saved. Certainly, connecting line groups and wires may be fabricated in layers, and no limit will be set here.

Further, in order that connecting line groups and the wires are distributed uniformly, in an in-cell touch panel provided by an embodiment of the invention, as illustrated in FIG. 4a to FIG. 4d, the wires 03 and the connecting line groups 04 are arranged alternately.

For example, in order to achieve an equal-capacitance design, in an in-cell touch panel provided by an embodiment of the invention, as illustrated in FIG. 4a to FIG. 4d, the wires 03 are of the same length.

For example, in order that via holes are distributed uniformly in the whole in-cell touch panel, in an in-cell touch panel provided by an embodiment of the invention, as illustrated in FIG. 4a to FIG. 4d, the sub connecting lines 041 are each connected to respective self-capacitive electrodes 02 through the same number of via holes V.

Further, in order to ensure uniformity of pattern in a display region of an in-cell touch panel, in an in-cell touch panel provided by an embodiment of the invention, both the shape and size of via holes are the same. For example, the shape of via holes may be a circle, a square or any other geometric shape, and no limit will be set here.

Further, in an in-cell touch panel provided by an embodiment of the invention, as for each piece of sub connecting line, the distance between any two adjacent via holes in correspondence with the sub connecting line is the same. As such, it is ensured that all via holes in the in-cell touch panel are distributed uniformly, and thus uniformity of the display picture is ensured.

For example, in an in-cell touch panel provided by an embodiment of the invention, the extending direction of the connecting line groups is a column direction or a row direction.

For example, in order to simplify the manufacturing process, in an in-cell touch panel provided by an embodiment of the invention, a plurality of self-capacitive electrodes independently of each other are disposed in the same layer. As such, the pattern of all self-capacitive electrodes can be formed only by one patterning process, so that the process steps can be simplified, and the manufacturing cost is saved. Certainly, self-capacitive electrodes may also be fabricated in layers, and no limit will be set here.

Further, for example, the in-cell touch panel provided by embodiments of the invention, is not only suitable for twisted nematic (TN) mode liquid crystal display panels, but also suitable for advanced dimension switch (ADS) mode liquid crystal display panels, high-aperture-ratio advanced dimension switch (HADS) mode liquid crystal display panels and in-plane switch (IPS) mode liquid crystal display panels.

Further, when the in-cell touch panel provided by embodiments of the invention is applied to an ADS mode liquid crystal display panel, a common electrode layer with a plate-like structure is located below a slit-like pixel electrode, namely, the common electrode is located between a lower substrate and the pixel electrode, and moreover, a passivation layer is further provided between the common electrode and the pixel electrode. While it is applied to a HADS mode liquid crystal display panel, a slit-like common electrode is located above a pixel electrode with a plate-like structure, namely, the pixel electrode is located between a lower substrate and the common electrode, and a passivation layer is further provided between the pixel electrode and the common electrode.

For example, when the in-cell touch panel provided by embodiments of the invention is applied to a liquid crystal display panel of an ADS mode or a HADS mode, in order to simplify the manufacturing process and reduce the manufacturing cost, a common electrode layer located on a lower substrate may be multiplexed as the self-capacitive electrodes. Namely, the self-capacitive electrodes constitute the common electrode layer located on a side of the lower substrate facing an upper substrate.

A touch detection chip also serves for loading a common electrode signal onto each self-capacitive electrode in a display period. As such, in the event that structure of a common electrode layer is changed in such a way that it is divided into self-capacitive electrodes for achievement of a touch function, on the basis of a general manufacturing process of array substrate, there is no need to add an additional process, so that the production cost can be saved, and the production efficiency is enhanced.

For example, as a common electrode layer is multiplexed as the self-capacitive electrodes in a touch panel provided by embodiments of the invention, with the aim of reducing the mutual interference between display and touch signals, for example, a time-division driving manner may be adopted for touch control and display. And, a display driving chip and a touch detection chip may also be integrated to be one chip upon concrete implementation, so as to further reduce the production cost.

Figure 3A:
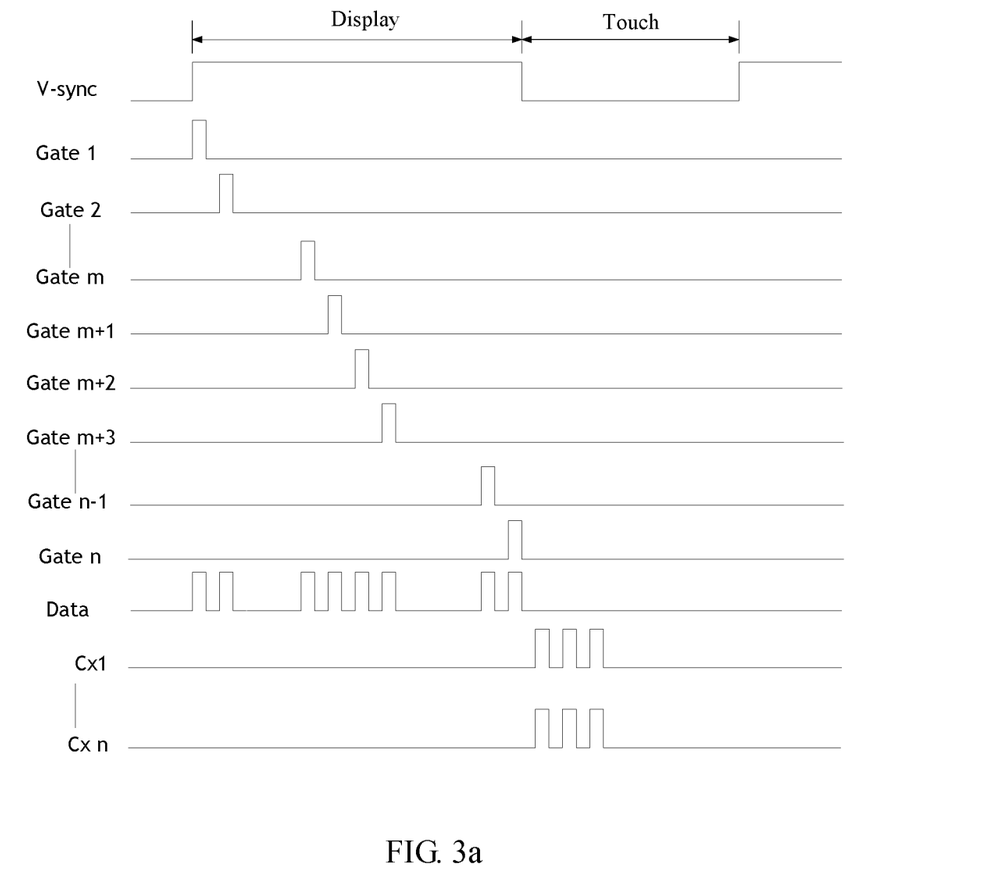
FIG. 3a is a schematic diagram illustrating a driving timing of an in-cell touch panel provided by an embodiment of the invention.
Figure 3B:
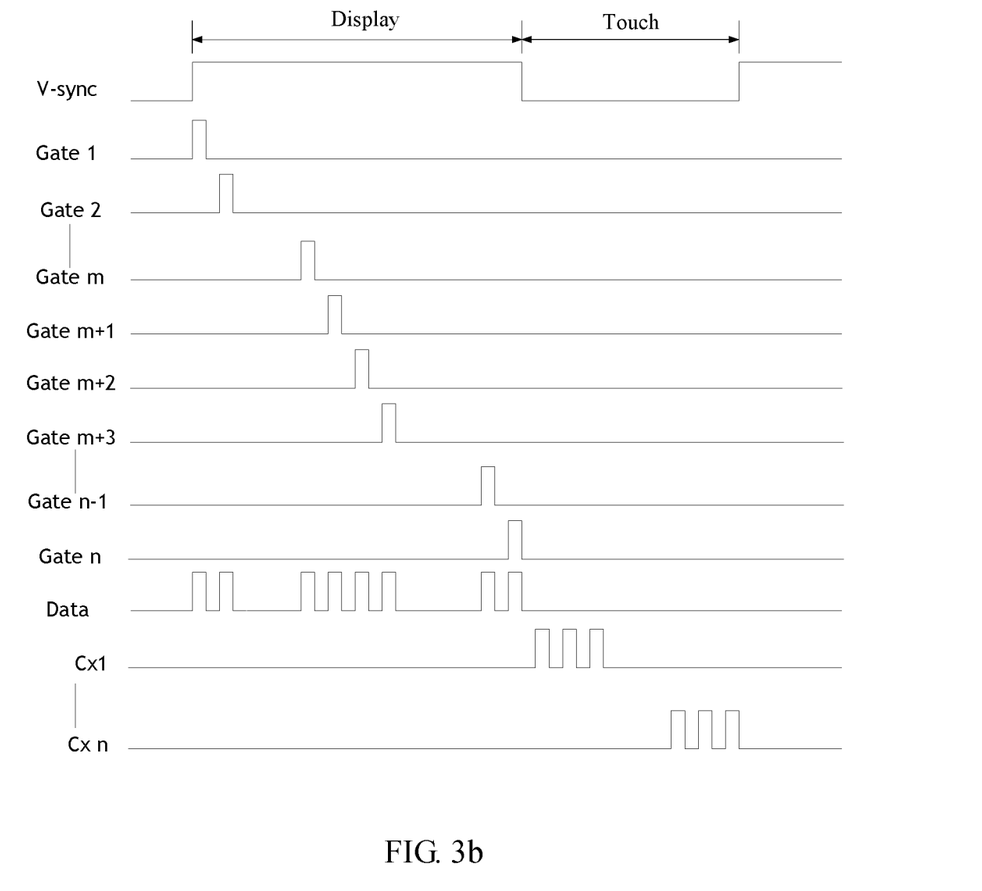
FIG. 3b is another schematic diagram illustrating a driving timing of an in-cell touch panel provided by an embodiment of the invention.

For example, in the drive timing diagram illustrated in FIG. 3a and FIG. 3b, the time for display of each frame (V-sync) of the touch panel is divided into a display time period (Display) and a touch time period (Touch). For example, the time for display of one frame of the touch panel in the drive timing diagram illustrated in FIG. 3a and FIG. 3b is 16.7 ms, 5 ms of it is chosen as the touch time period, and the remaining 11.7 ms serves as the display time period. Of course, the durations of the two may also be appropriately adjusted according to the processing capacity of an IC chip, and they will not be specifically limited here. In the display time period (Display), a gate scanning signal is applied to each of gate signal lines Gate1, Gate2, . . . Gate n in the touch panel in sequence, a gray-scale signal is applied to a data signal line Data, and a common electrode signal is provided to the self-capacitive electrodes Cx1, . . . Cxn, respectively, by the touch detection chip connected to the self-capacitive electrodes Cx1, . . . Cxn, so as to achieve a liquid crystal display function. In the touch time period (Touch), as illustrated in FIG. 3a, the touch detection chip connected to the self-capacitive electrodes Cx1, . . . Cxn applies driving signals to the self-capacitive electrodes Cx1, . . . Cxn simultaneously, and meanwhile receive feedback signals of the self-capacitive electrodes Cx1, . . . Cxn; there may also be the case that, as illustrated in FIG. 3b, the touch detection chip connected to the self-capacitive electrodes Cx1, . . . Cxn applies driving signals to the self-capacitive electrodes Cx1, . . . Cxn in sequence, and respectively receive feedback signals of the self-capacitive electrodes Cx1, . . . Cxn. No limit will be set here. Whether or not a touch occurs is judged by analyzing the feedback signals, so as to achieve a touch function.

Generally, the density of a touch panel is usually on the order of millimeters. Thus, the density and occupied area of the self-capacitive electrodes can be selected according to the required touch density so as to ensure the required touch density. In general, each self-capacitive electrode is designed to be a square electrode of about 5 mm×5 mm. While the density of a display panel is usually on the order of micrometers, and therefore, one self-capacitive electrode may generally correspond to a plurality of pixel units in the display panel.

Furthermore, in an in-cell touch panel provided by an embodiment of the invention, a common electrode layer that is disposed on a lower substrate as a complete layer usually may be divided into a plurality of self-capacitive electrodes, and in order not to affect the normal display function, when the common electrode layer is divided, a dividing line will usually keep away from an opening zone for display. For example, it may be arranged in a corresponding region of pattern of a black matrix layer.

Further, in order to simplify the manufacturing process and reduce the manufacturing cost, in an in-cell touch panel provided by an embodiment of the invention, the following may be further included: data lines located on a side of a lower substrate facing an upper substrate. The wires and the data lines are disposed in the same layer, or the connecting line groups and the data lines are disposed in the same layer. As such, upon manufacture, the wires or the connecting line groups and the data lines may be fabricated in the same layer, and thus this can be realized merely by changing pattern of a corresponding film layer without the need of adding a new manufacturing process. Consequently, the process steps are simplified, the production cost is saved, and the production efficiency is enhanced.

For example, in an in-cell touch panel provided by an embodiment of the invention, both the wires and the connecting line groups are disposed in the same layer as the data lines.

Figure 4A:
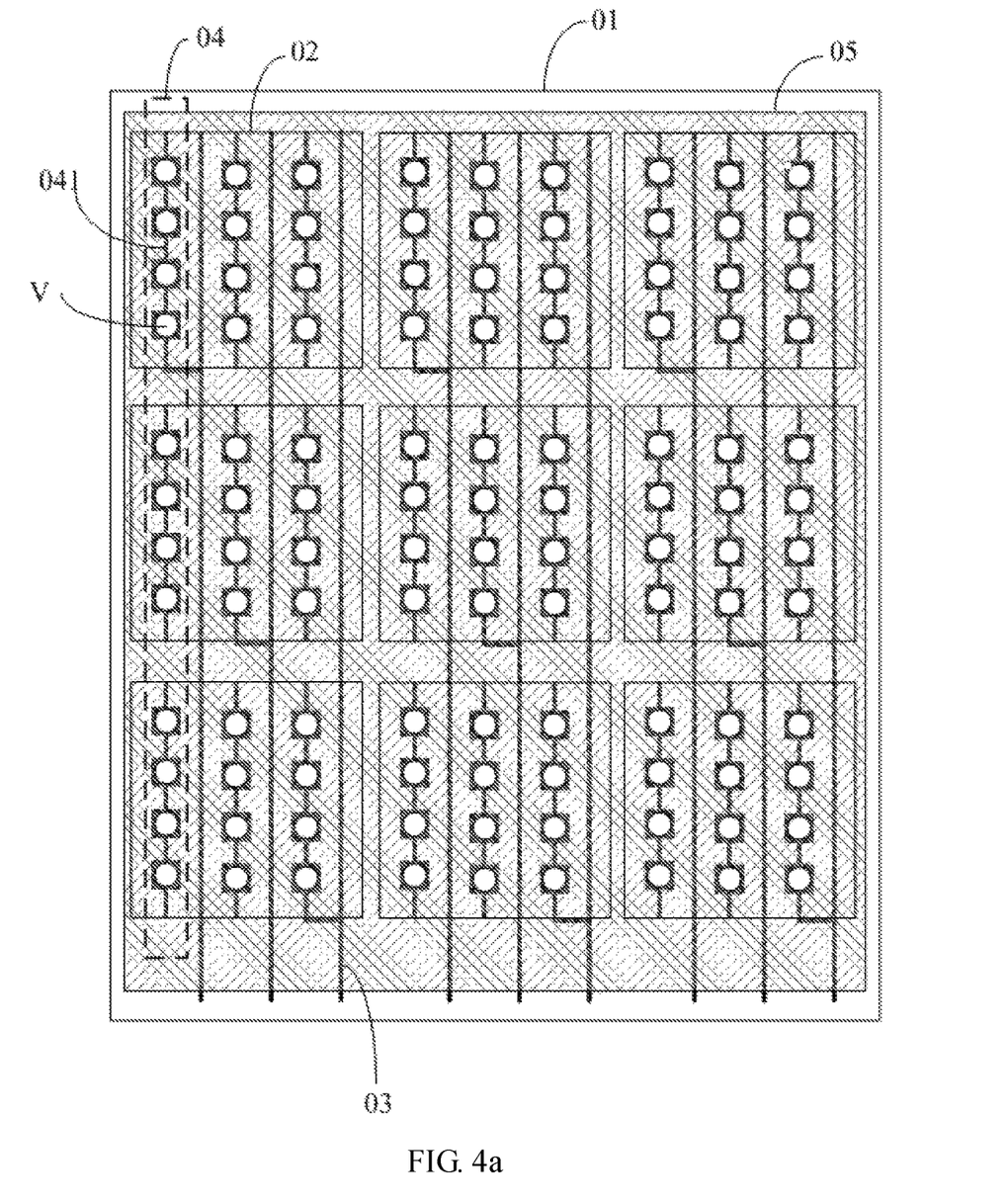
FIG. 4a is another structural schematic view illustrating an in-cell touch panel provided by an embodiment of the invention.
Figure 4B:
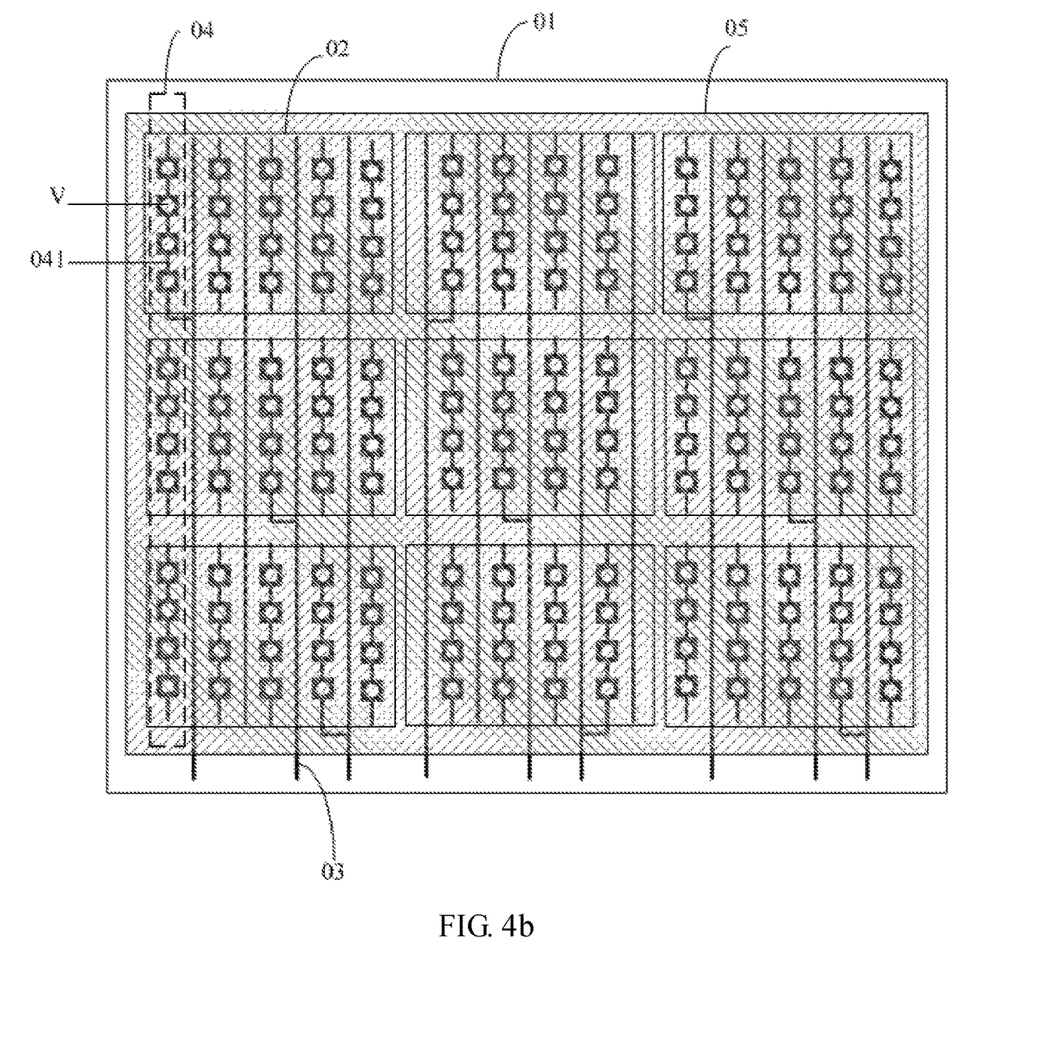
FIG. 4b is another structural schematic view illustrating an in-cell touch panel provided by an embodiment of the invention.
Figure 4C:
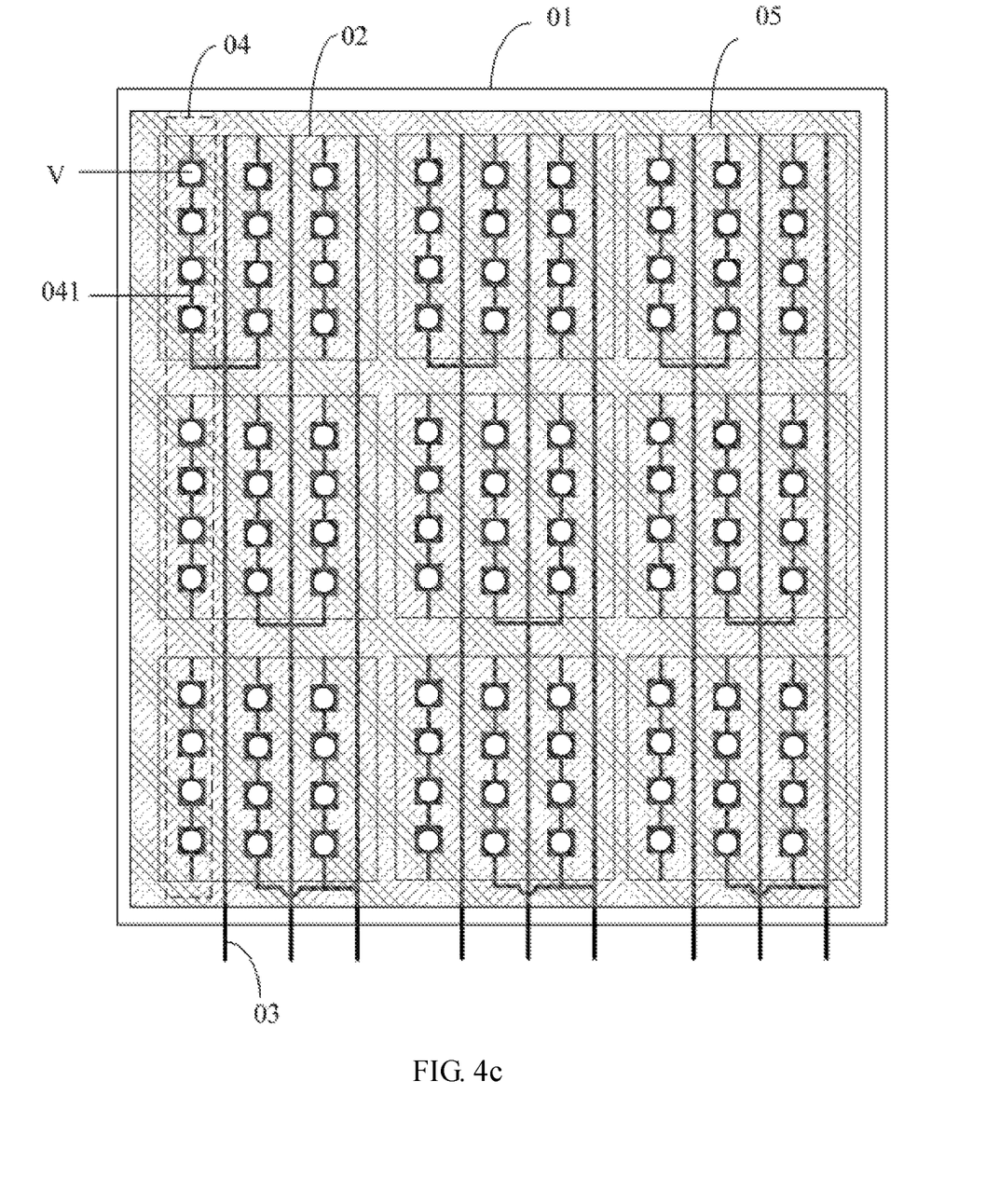
FIG. 4c is another structural schematic view illustrating in-cell touch panel provided by an embodiment of the invention.
Figure 4D:
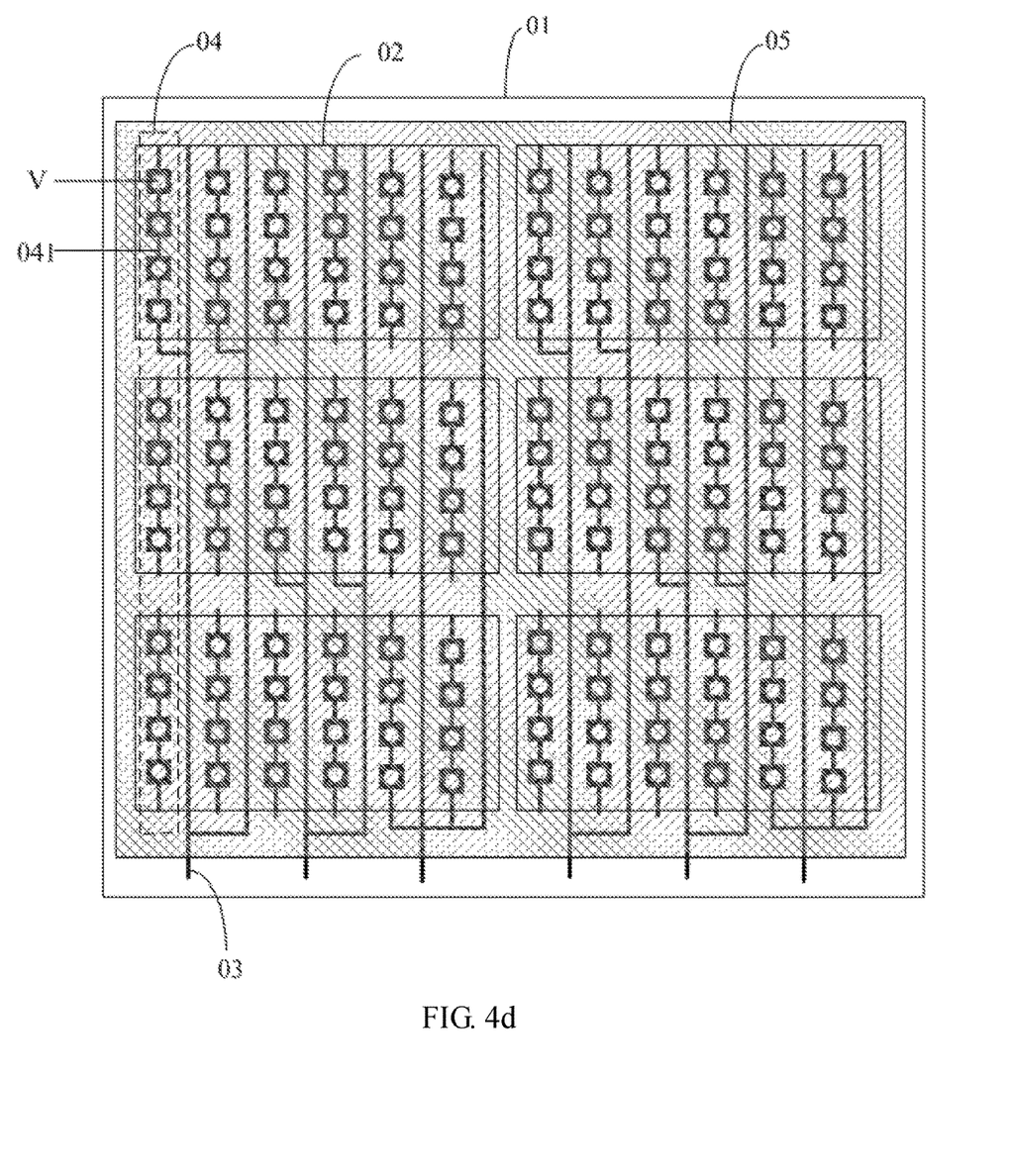
FIG. 4d is another structural schematic view illustrating in-cell touch panel provided by an embodiment of the invention.
Figure 4E:
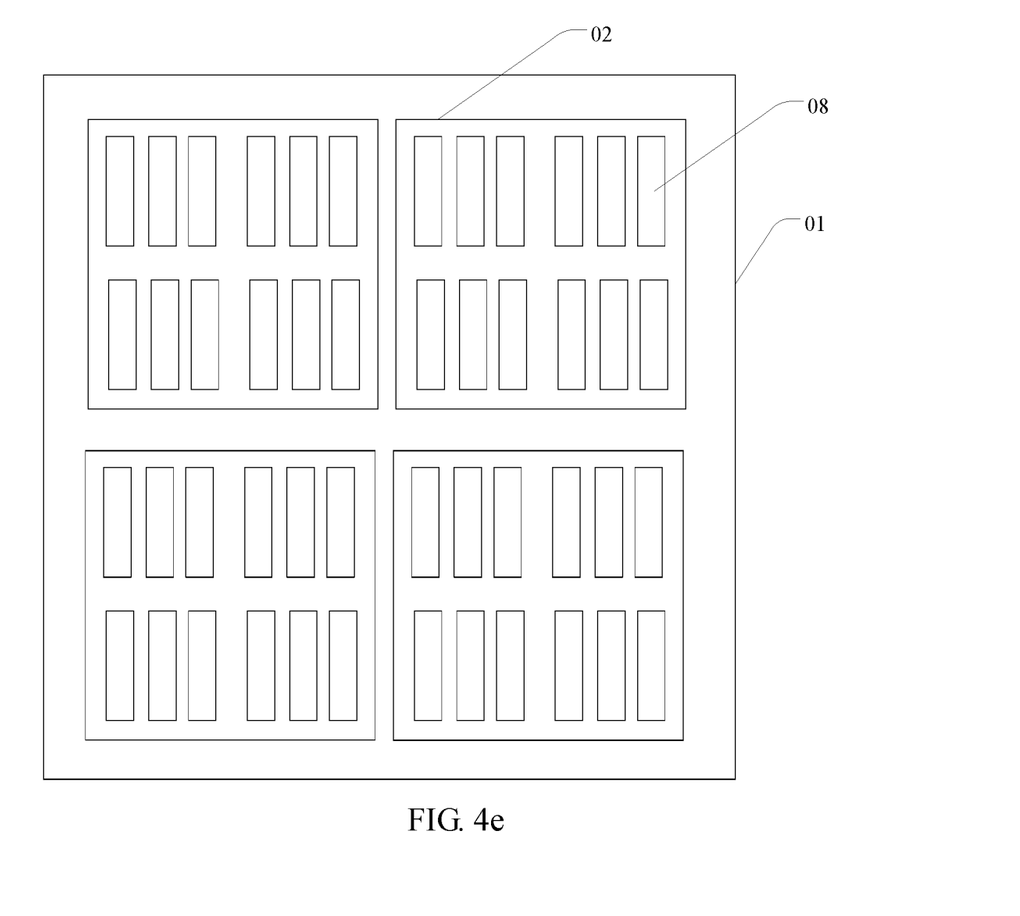
FIG. 4e is a structural schematic view illustrating pixel units and self-capacitive electrodes of an in-cell touch panel provided by an embodiment of the invention.

For example, when the wires and the connecting line groups are each disposed in the same layer as the data lines, the in-cell touch panel further includes a plurality of pixel units located on a side of the lower substrate facing the upper substrate and arranged in a matrix form. As illustrated in FIG. 4a to FIG. 4d, each self-capacitive electrode 02 corresponds to multiple pixel units 08 (not illustrated in the figure, please refer to FIG. 4e), the wires 03 and the connecting line groups 04 each extend along a column direction, and the connecting line groups 04 and wires 03 disposed alternately correspond to ones of the columns of pixel units, respectively. In FIG. 4e, one self-capacitive electrode 02 corresponds to twelve pixel units.

Each self-capacitive electrode 02 may be connected to the touch chip by one or more wires 03, and through one or more sub connecting lines 041, the wires 03 may be respectively connected respective self-capacitive electrodes 02. No limit will be set here. For example, as illustrated in FIGS. 4a to 4c, one self-capacitive electrode 02 is electrically connected to one wire 03 in correspondence. In FIG. 4b, a wire into which no signal is input may be provided, and it may be divided into sections, and may also be connected to a sub connecting line into which no signal is input, no limit being set here. As illustrated in FIG. 4d, one self-capacitive electrode 02 is electrically connected to multiple wires 03 in correspondence. As illustrated in FIG. 4a, FIG. 4b and FIG. 4d, for each wire 03 electrically connected to a self-capacitive electrode 02, its connection to the self-capacitive electrode 02 is realized by one sub connecting line 041, and as illustrated in FIG. 4c, for each wire 03 electrically connected to a self-capacitive electrode 02, its connection to the self-capacitive electrode 02 is realized by multiple sub connecting lines 041.

Based on the same inventive concept, according to an embodiment of the invention, there is further provided a display device, which includes any of the above in-cell touch panel provided by embodiments of the invention.

For example, the display device may be a cell phone, a watch, a tablet computer, a television, a display, a notebook computer, a digital photo frame, a navigator or any other product or component having a display function. Regarding implementation of an in-cell touch panel included by the display device, reference to above embodiments of the in-cell touch panel can be made, and repetitions are omitted here.

With respect to an in-cell touch panel and a display device provided by embodiments of the invention, it includes wires and self-capacitive electrodes disposed in different layers, and includes a plurality of connecting line groups not disposed in the same layer as the self-capacitive electrodes besides; each of the connecting line groups includes a plurality of sub connecting lines disposed separately, sub connecting lines belonging to the same connecting line group correspond to different ones of the self-capacitive electrodes, respectively, and each sub connecting line is connected to a respective self-capacitive electrode through at least one via hole penetrating an insulating layer; no via hole is provided in the region where the wires and the self-capacitive electrodes overlap, and the wire is connected to a respective self-capacitive electrode through at least one sub connecting line that is connected to the respective self-capacitive electrode. In the above in-cell touch panel, each connecting line group is configured as a plurality of sub connecting lines disposed separately, so as to ensure mutual insulation between the self-capacitive electrodes. By evenly arranging via holes in a region in correspondence with each sub connecting line of a connecting line group, it is ensured that via holes are uniformly distributed in the in-cell touch panel. The wire is connected to a respective self-capacitive electrode through at least one sub connecting line that is connected to the respective self-capacitive electrode, connection of a self-capacitive electrode and a respective wire is ensured. Therefore, with the in-cell touch panel, on the grounds that the proper connection between the self-capacitive electrode and the wire can be ensured, the problem of non-uniform display picture caused by non-uniform distribution of via holes in an insulating layer in the general technology is solved.

There are several points needed to explain as follows:

(1) Drawings of embodiments of the invention are merely for exemplary illustration, and the number of components is not limited the number illustrated in drawings.

(2) Drawings of embodiments of the invention merely pertain to structures involved in embodiments of the invention, and as for other structure, reference to a general design can be made.

(3) For the sake of clarity, in drawings for illustrating embodiments of the invention, thickness of layers or regions are magnified in or out, namely, these drawings are not drawn according to the actual proportion. It will be understood that when an element such as a layer, film, region, substrate or the like is referred to as being "on" or "under" another element, it can be "directly" located "on" or "under" the other element, or intervening elements may also be present.

(4) In the case of no confliction, embodiments of the invention and characteristics in the embodiments can be combined with each other to obtain new embodiments.

Descriptions made above are merely specific embodiments of the present invention, but the protection scope of the invention is not limited thereto. Changes or replacements, as easily conceivable by those skilled in the art within the technical scope disclosed by the invention, shall be encompassed within the protection scope of the invention. Therefore, the protection scope of the invention shall be determined by the protection scope of attached claims.

This patent application claims the benefit of priority from Chinese patent application No. 201510020674.2, filed on Jan. 15, 2015, the disclosure of which is incorporated herein in its entirety by reference as a part of the present application.

The invention claimed is:

1. An in-cell touch panel, comprising
an upper substrate and a lower substrate disposed oppositely,
a plurality of self-capacitive electrodes independent of each other and arranged in a matrix form,
a plurality of wires that are not disposed in the same layer as the plurality of self-capacitive electrodes,
a plurality of connecting line groups not disposed in the same layer as the plurality of self-capacitive electrodes, and
an insulating layer located between the connecting line groups and the self-capacitive electrodes; wherein
the plurality of self-capacitive electrodes, the plurality of wires and the plurality of connecting line groups are each located on a side of the upper substrate facing the lower substrate or a side of the lower substrate facing the upper substrate;
each of the connecting line groups includes a plurality of sub connecting lines disposed separately,
sub connecting lines belonging to a same connecting line group correspond to different ones of the self-capacitive electrodes, respectively, and
each sub connecting line is directly connected to a respective self-capacitive electrode through a plurality of via holes penetrating the insulating layer;
at least one of the plurality of wires is connected to a respective self-capacitive electrode through at least one sub connecting line that is connected to the respective self-capacitive electrode; and
the plurality of self-capacitive electrodes include a first self-capacitive electrode,
the plurality of wires include a first wire and a second wire,
the plurality of sub connecting lines include a first sub connecting line and a second sub connecting line;

the first wire, the second wire, the first sub connecting line, and the second sub connecting line are overlapped with the first self-capacitive electrode in a plan view of the in-cell touch panel;

the first sub connecting line and the second sub connecting line are directly connected with the first self-capacitive electrode, respectively;

the first sub connecting line is directly connected with the first wire, the second sub connecting line is not connected with the second wire, the first wire is not connected with the second wire, the first wire is connected with a touch detection chip, the second wire is not connected with the touch detection chip, the second wire is not connected with the first self-capacitive electrode, and the second wire is a wire into which no signal is input.

2. The in-cell touch panel as claimed in claim 1, wherein the sub connecting lines belonging to the same connecting line group are situated in a same straight line, and the connecting line groups are arranged in parallel.

3. The in-cell touch panel as claimed in claim 1, wherein all of the sub connecting lines are disposed in a same layer.

4. The in-cell touch panel as claimed in claim 3, wherein an extending direction of the wires is the same as an extending direction of the connecting line groups.

5. The in-cell touch panel as claimed in claim 1, wherein the plurality of connecting line groups and the plurality of wires are disposed in a same layer.

6. The in-cell touch panel as claimed in claim 5, wherein the wires and the connecting line groups are disposed alternately.

7. The in-cell touch panel as claimed in claim 1, wherein each sub connecting line is respectively connected to a respective self-capacitive electrode through a same number of via holes.

8. The in-cell touch panel as claimed in claim 1, wherein an extending direction of the connecting line groups is a column direction or a row direction.

9. The in-cell touch panel as claimed in claim 1, wherein the touch detection chip is configured to judge a touch location by detecting change in capacitance value of each of the self-capacitive electrodes in a touch period.

10. The in-cell touch panel as claimed in claim 1, wherein the self-capacitive electrodes are multiplexed as a common electrode layer, and the touch detection chip also serves for loading of a common electrode signal onto each of the self-capacitive electrodes in a display period.

11. The in-cell touch panel as claimed in claim 10, wherein the common electrode layer is located on a side of the lower substrate facing the upper substrate.

12. The in-cell touch panel as claimed in claim 11, further comprising a plurality of data lines located on a side of the lower substrate facing the upper substrate; wherein the wires and the plurality of data lines are disposed in a same layer; and/or the connecting line groups and the plurality of data lines are disposed in a same layer.

13. The in-cell touch panel as claimed in claim 11, further comprising a plurality of pixel units located on a side of the lower substrate facing the upper substrate and arranged in a matrix form;

each of the self-capacitive electrodes corresponds to multiple pixel units, the wires and the plurality of connecting line groups each extend along a column direction, and the connecting line groups and the wires disposed alternately correspond to respective ones of columns of pixel units, respectively.

14. The in-cell touch panel as claimed in claim 1, wherein each of the self-capacitive electrodes is connected to the touch detection chip through more than one of the wires, and each of the wires is respectively connected to a respective self-capacitive electrode through more than one of the sub connecting lines.

15. A display device, comprising the in-cell touch panel as claimed in claim 1.

16. The in-cell touch panel as claimed in claim 1, wherein in the plan view of the in-cell touch panel, each of the plurality of sub connecting lines is overlapped with one self-capacitive electrode.

17. The in-cell touch panel as claimed in claim 1, wherein the first wire and the second wire are different wires.

18. The in-cell touch panel as claimed in claim 1, wherein an orthographic projection of the first wire on the upper substrate is partially overlapped with an orthographic projection of the first self-capacitive electrode on the upper substrate, and an orthographic projection of the second wire on the upper substrate is partially overlapped with an orthographic projection of the first self-capacitive electrode on the upper substrate.

* * * * *